(12) United States Patent
Sviberg

(10) Patent No.: US 10,583,722 B2
(45) Date of Patent: Mar. 10, 2020

(54) CONVERTIBLE TOP AND VEHICLE HAVING SUCH A CONVERTIBLE TOP

(71) Applicant: Webasto SE, Stockdorf (DE)

(72) Inventor: Magnus Sviberg, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 91 days.

(21) Appl. No.: 16/013,116

(22) Filed: Jun. 20, 2018

(65) Prior Publication Data

US 2019/0389291 A1 Dec. 26, 2019

(51) Int. Cl.
*B60J 7/14* (2006.01)
*B60J 7/20* (2006.01)
*B60J 7/12* (2006.01)

(52) U.S. Cl.
CPC .................... *B60J 7/143* (2013.01)

(58) Field of Classification Search
CPC ........ B60J 7/143; B60J 7/1208; B60J 7/1204; B60J 7/20
See application file for complete search history.

(56) References Cited

U.S. PATENT DOCUMENTS

2018/0201104 A1* 7/2018 Sviberg ................. B60J 7/1204
2019/0001798 A1* 1/2019 Sviberg ................. B60J 7/146

* cited by examiner

*Primary Examiner* — D Glenn Dayoan
*Assistant Examiner* — Melissa Ann Bonifazi
(74) *Attorney, Agent, or Firm* — Fitch, Even, Tabin & Flannery LLP

(57) ABSTRACT

Convertible top linkage arrangements on both of its two sides relative to the top's vertical longitudinal center plane pivotally mounted on a fixed main bearing, fastenable to a vehicle front wind apron by a front bow, connecting the arrangements to each other, both arrangements having a roof link whose front end reaches to the front wind apron in a closing position, the front bow fastenable to a deployment link on each side, the deployment link pivotally mounted on the respective roof link so that a fold section, which can be pivoted between a closing position, in which the deployment links extend along the roof links, and an opening position, in which the deployment links are pivoted with respect to the roof links, is formed by the front bow and the deployment link, the fold section taking its closing position with respect to the roof links when pivoting the top linkage.

8 Claims, 12 Drawing Sheets

CONVERTIBLE TOP AND VEHICLE HAVING SUCH A CONVERTIBLE TOP

FIELD

The invention relates to a top of a convertible vehicle and a convertible vehicle having such a top.

BACKGROUND

From practice, a top for a convertible vehicle is known, comprising a top linkage which can be displaced between a top or closing position spanning a vehicle interior and a storage position opening the vehicle interior upward and which comprises a link arrangement on both of its two sides relative to a vertical longitudinal center plane of the top, said link arrangements being pivotally mounted on a main bearing fixed on the vehicle. The top linkage is provided with a front bow which extends in the transverse direction of the top and by means of which the top can be fastened to a front wind apron of the respective vehicle when in the closing position. The two link arrangements arranged on both sides each comprise a main link arrangement as well as a roof link whose front end reaches to the front wind apron and on which the front bow is mounted when the closing position is realized.

SUMMARY OF THE INVENTION

The object of the invention is to create a top of a convertible vehicle, which enables partially opening the top, and a convertible vehicle having such a top.

In order to attain this object, a top for a convertible vehicle is proposed, comprising a top linkage which can be displaced between a top position spanning a vehicle interior and a storage position opening the vehicle interior upward and which comprises a link arrangement on both of its two sides relative to a vertical longitudinal center plane of the top, said link arrangements each being pivotally mounted on a main bearing fixed on the vehicle, said top linkage being able to be fastened to a front wind apron of the vehicle by means of a front bow, which connects the two link arrangements to each other, both link arrangements each comprising a roof link whose front end reaches to the front wind apron when the top linkage is in the top position, said front bow being fastened to a deployment link on each of its two sides relative to the vertical longitudinal center plane of the top, said deployment link being pivotally mounted on the respective roof link so that a fold section, which can be pivoted between a closing position and an opening position and which enables partially opening the top without pivoting the roof links when the top linkage is in the top position, is formed by the front bow and the deployment link, said fold section taking up its closing position with respect to the roof links when displacing the top linkage into the storage position.

Thus, a mechanism, which enables a partial opening, is directly integrated in the proposed top in the form of the fold section. Owing to the roof links not being pivoted, the possibility of seals arranged on the roof links each being designed continuously or in one piece is given. The fold section can be integrated into a top at little cost. Moreover, the fold section is characterized by a slight additional weight since only the deployment links have to be additionally provided with respect to a generic top.

In a specific embodiment of the top, the deployment links of the fold section extend parallel to the roof links when in a closing position while being pivoted with respect to the roof links when in an opening position.

When the fold section is in the closing position and the top linkage is in the top position, the entire top linkage can be secured to the front wind apron of the respective vehicle via the front bow. In order to unambiguously determine the position of the roof links, it is advantageous for the deployment links to be secured to the roof links by means of a locking device when the fold section is in the closing position.

For example, the locking device comprises a glider which interacts with a locking pin. The slider can moreover be designed such that when releasing the respective deployment link the slider secures the roof link to the vehicle construction with respect to the respective roof link so that the top linkage remains in its top position in a displacement-proof manner despite of the fold section being pivoted in the opening position.

In order for a large area of the top to be released by the fold section, an additional bow can be provided which can also be pivotally mounted on the roof links and is connected to the deployment links of the front bow via coupling links.

The proposed top is preferably a folding top, in which a front section of a top cover can be relocated to an area behind the released section by means of the fold section. In the top position of the top linkage and in the closing position of the fold section, the top cover extends from the front bow to a rear edge of the top formed by a rearward tensioning bow, for example.

According to another aspect, a convertible vehicle is proposed which comprises a top of the make described above.

The convertible vehicle is realized as an all-terrain vehicle or a so-called SUV (sport utility van), for example, which comprises a roof area, which extends horizontally when the top linkage is in the top position and when the fold section is in the closing position and which, in a rearward area, transitions into a rear area, which can also be partially spanned by a top cover.

BRIEF DESCRIPTION OF THE DRAWING

An embodiment of a passenger vehicle having a folding top is illustrated in the drawing in a schematically simplified manner and is described in further detail in the following.

DETAILED DESCRIPTION

Figure 1:
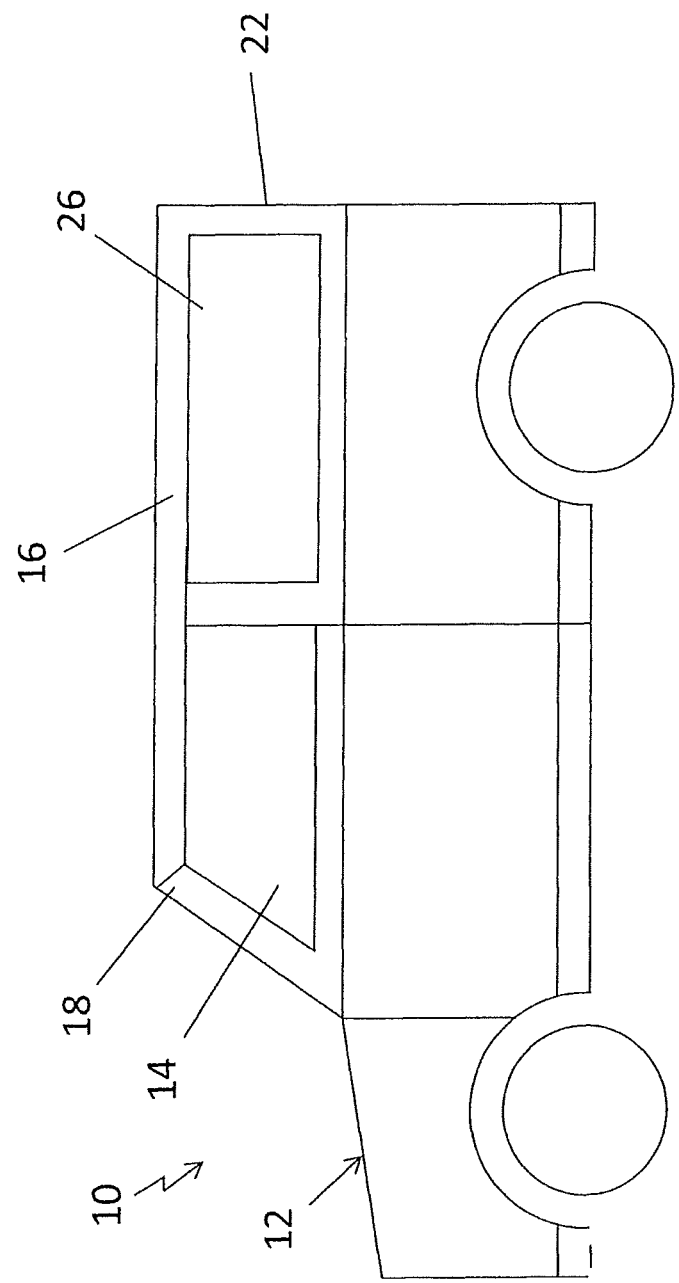
FIG. 1 illustrates a schematic side view of a passenger vehicle designed as an all-terrain vehicle having a folding top in its top position.
Figure 2:
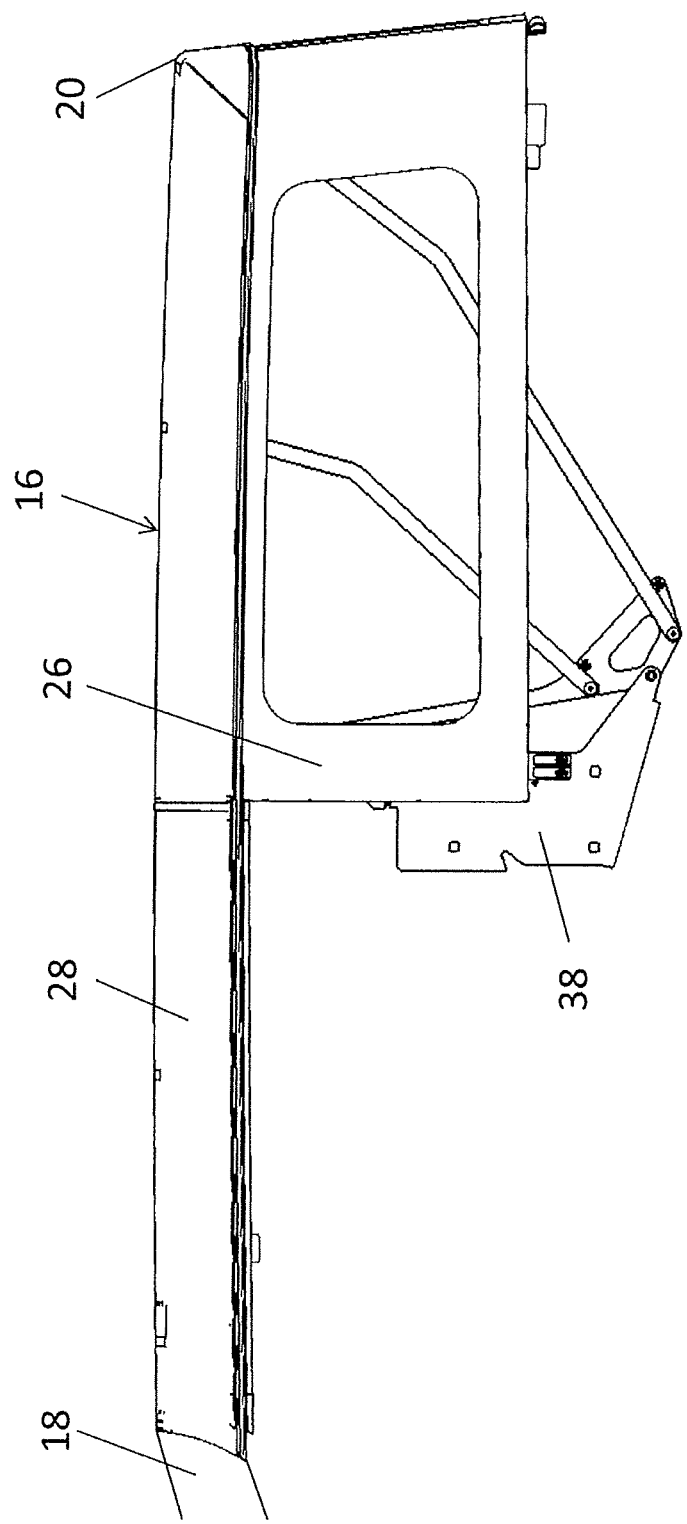
FIG. 2 illustrates a side view of the folding top in conjunction with a back side window when in the top position of the folding top.

In the illustration, a passenger vehicle 10 is illustrated, which is realized as an all-terrain vehicle and which comprises a vehicle construction 12 having a passenger area 14 enclosing a vehicle interior and being delimited upward by a vehicle roof 16 realized as folding top. In a top position illustrated in FIGS. 1 and 2, the vehicle roof 16 realized as a folding top extends between a front wind apron 18, which forms a windshield-frame upper leg extending in the transverse direction of the vehicle, and a rearward edge 20, which extends in the transverse direction of the vehicle and which poses a transition to a vehicle rear 22. In its rearward section, the vehicle design 12 further comprises side window elements 26 which delimit a cargo space of the vehicle interior from the side.

Figure 6:
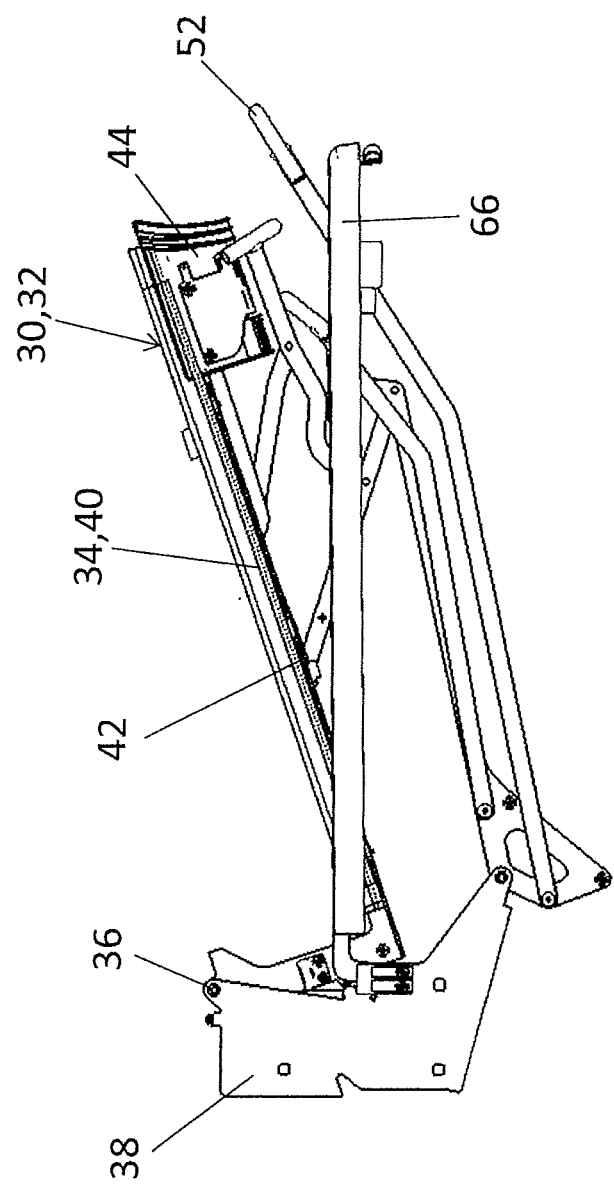
FIG. 6 illustrates the top linkage when in the storage position.

The top 16 comprises a top cover 28, which can be displaced by means of a top linkage 30. The top linkage 30 can be displaced between the top position, which is illustrated in FIGS. 1, 2, 3 and 4 and in which the vehicle interior is spanned, and the storage position, which is illustrated in FIG. 6 and in which the vehicle interior is opened upward and in which the top 16 is stored in a rearward storage space of the vehicle design 12.

The top linkage 30 comprises a link arrangement 32 on each of its two sides relative to a vertical longitudinal center plane of the top, said link arrangements 32 being provided with an L-shaped main link 34 which is pivotally mounted on a respective main bearing 38, which is fixed to the vehicle, by its short leg via an articulation point 36. When in the top position, a long leg 40 of the main link 34 forms a roof side beam which carries a one-piece seal 42. With its front or frontward end, the main link 34 reaches to or close to the front wind apron 18 of the vehicle construction 12 when in the top position.

Furthermore, the top linkage 30 comprises a front bow 44 and four tube-like transverse bows 46, 48, 50 and 52, which extend in the transverse direction of the roof and via which the top cover 28 is spanned in the top position. The transverse bows 46, 48, 50 and 52 are pivotally mounted via bow links 54, 56, 58, 60, 62 and 64 of the link arrangements 32 which are formed mirror-symmetrically to each other.

A tensioning bow 66 is linked to the main bearings 38 arranged on both sides, extends at the same height as a belt line surrounding the cargo space, and connects the two main bearings 38 arranged on both sides.

When in the top position, the front bow 44 is secured to the front wind apron 18 via two locking mechanisms 68, of which one is illustrated in FIGS. 9 to 12. For this purpose, two locking bows 70, which can each be engaged with a locking hook of the locking mechanisms 68, are arranged on the front wind apron.

Figure 3:
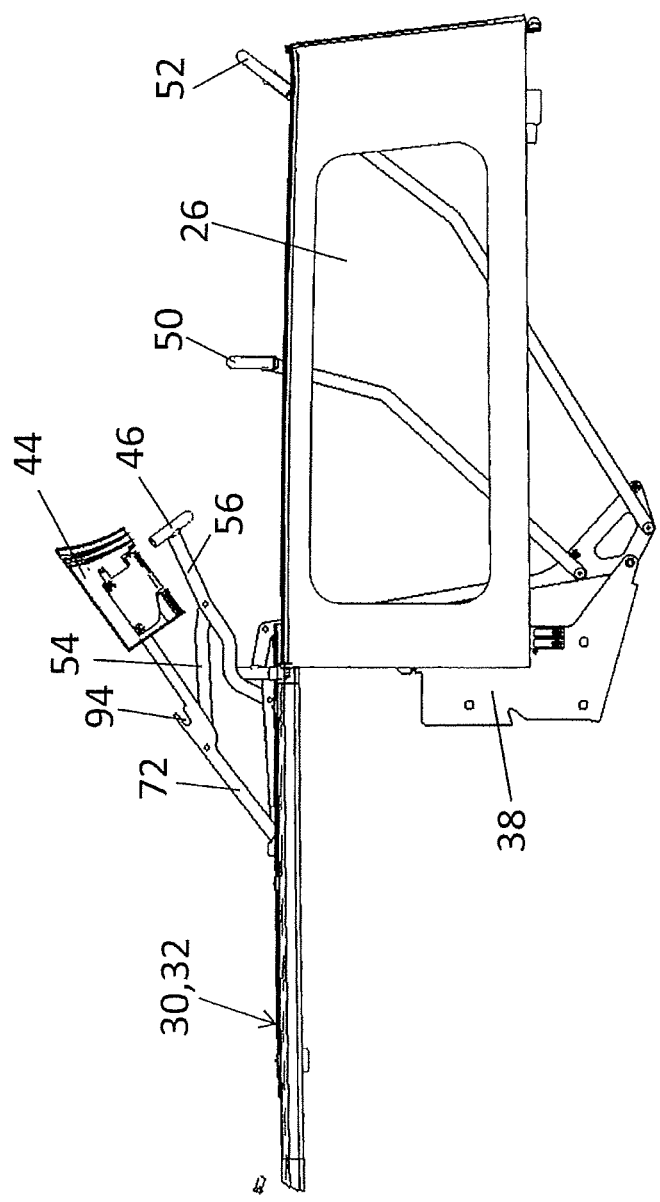
FIG. 3 illustrates a view of the folding top corresponding to the view of FIG. 2, however without illustrating a top cover and in an opening position of a fold section.
Figure 4:
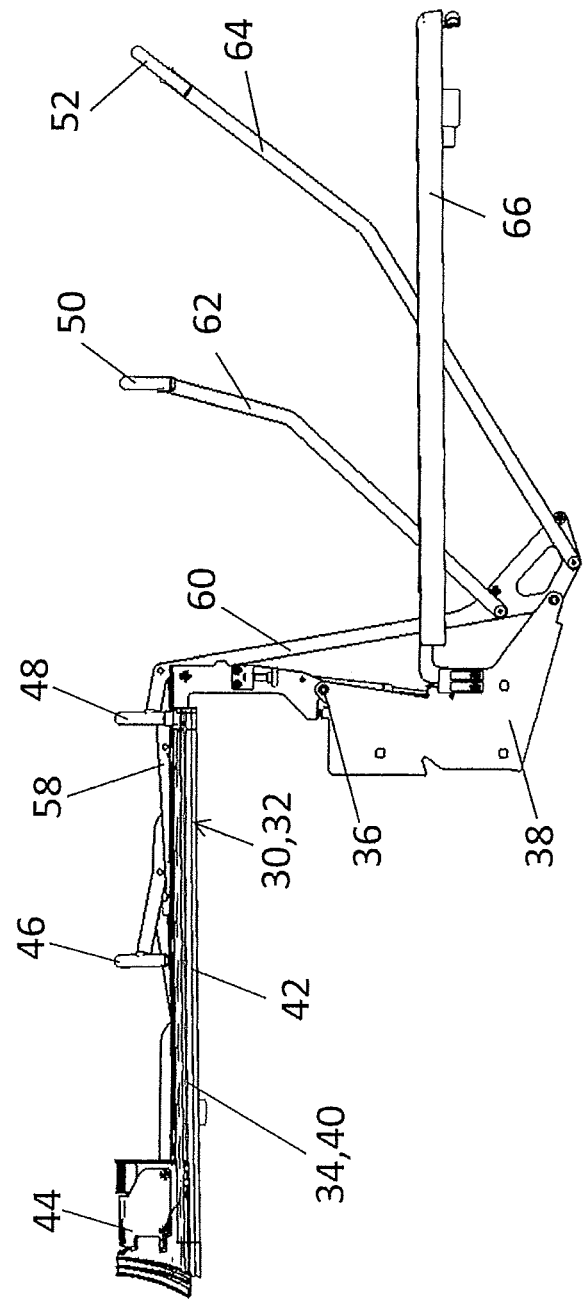
FIG. 4 illustrates a side view of a top linkage of the folding top when in the top position.
Figure 8:
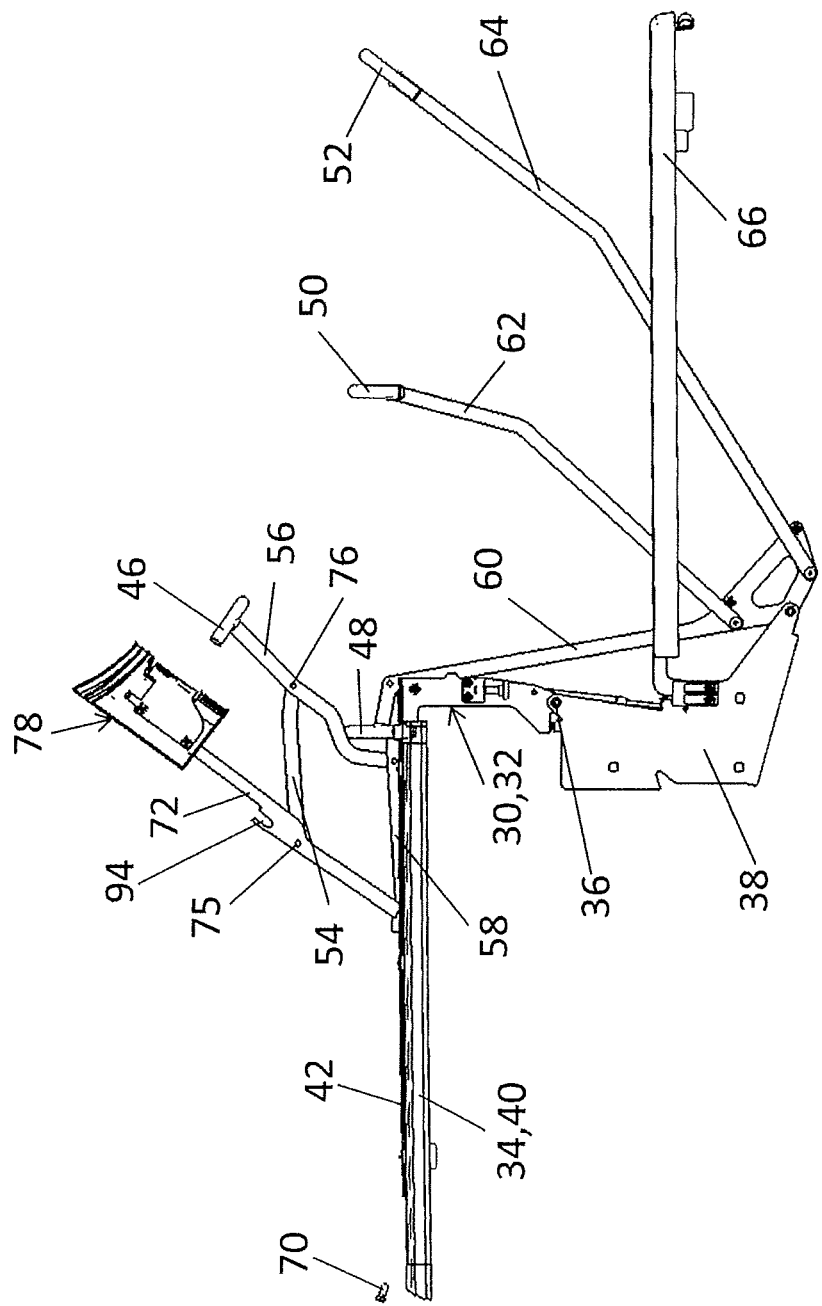
FIG. 8 illustrates a view corresponding to the view of FIG. 7, however in the opening position of the fold section.
Figure 9:
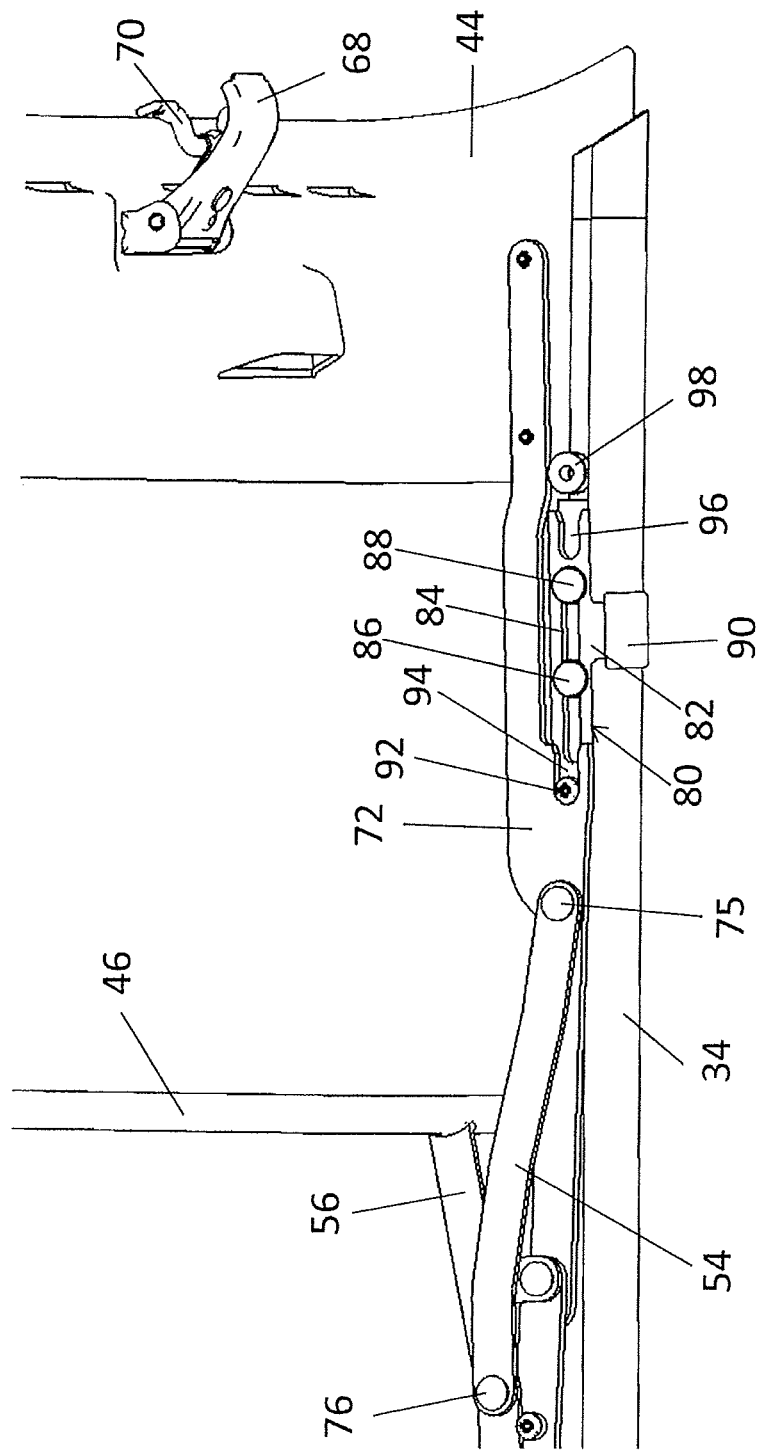
FIG. 9 illustrates a bottom view of the folding top in a front side area, in which a locking device is arranged for the fold section.
Figure 10:
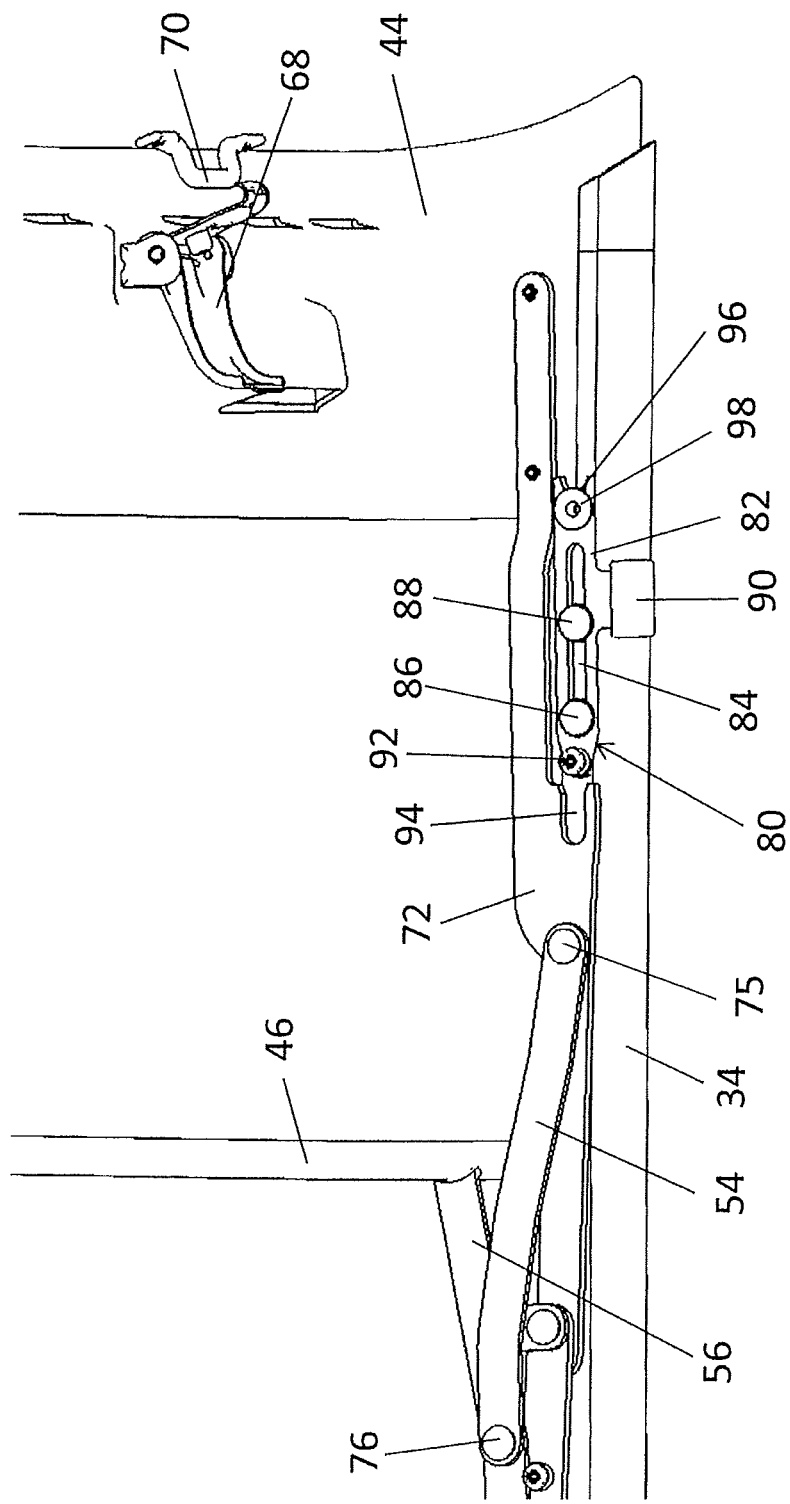
FIG. 10 illustrates a view of the folding top corresponding to the view of FIG. 9, however the fold section is unlocked with respect to a roof link.
Figure 11:
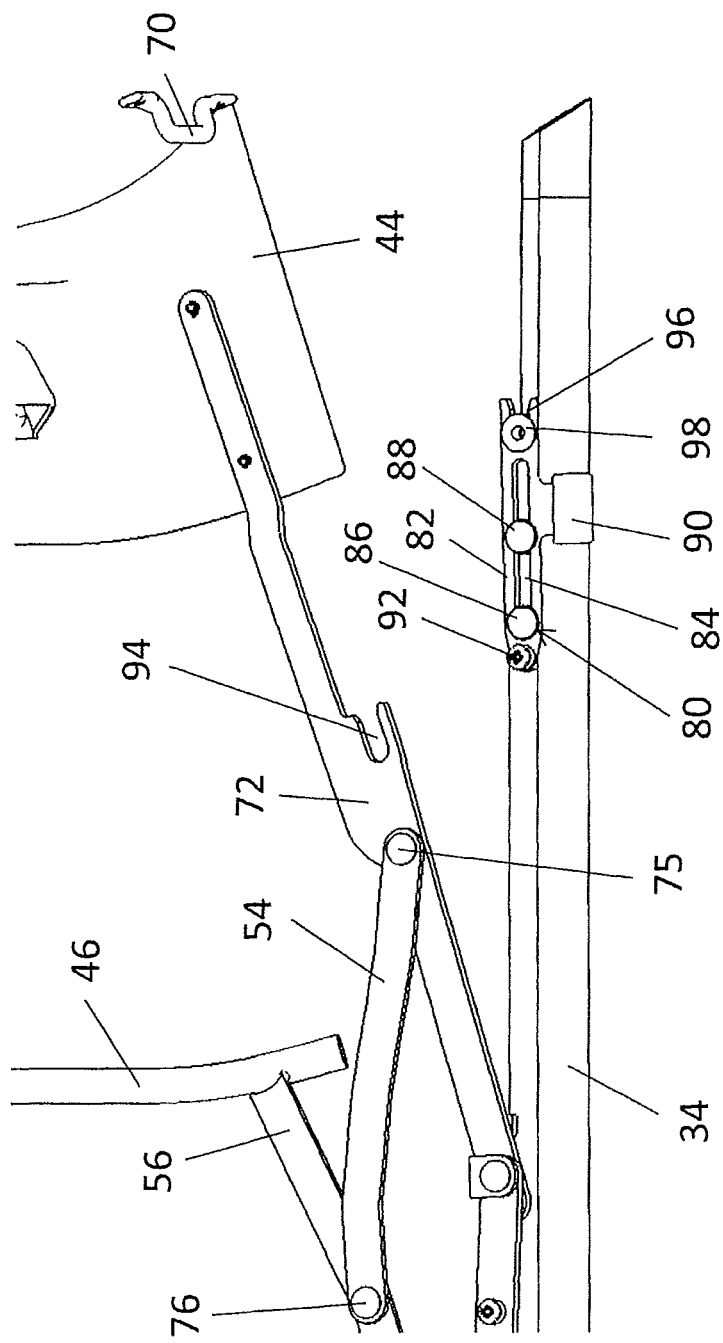
FIG. 11 illustrates a view of the folding top corresponding to the view of FIG. 10, however the fold section is pivoted.
Figure 12:
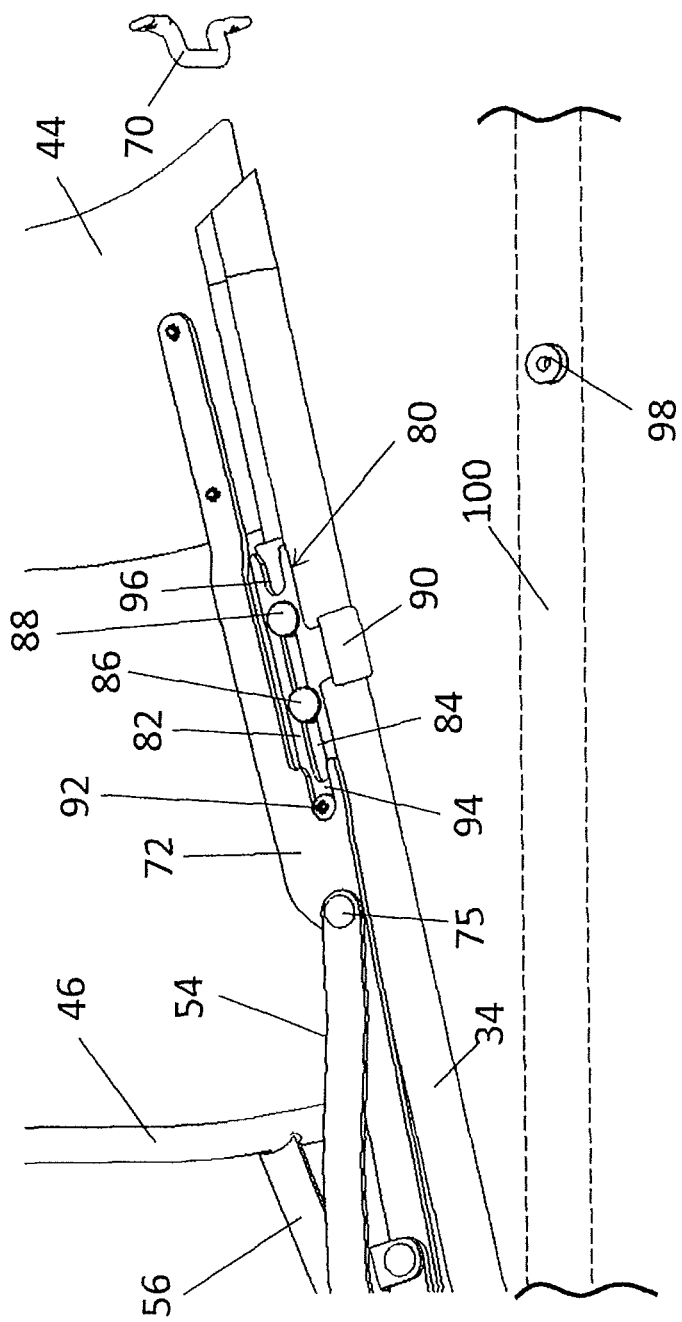
FIG. 12 illustrates a view of the folding top corresponding to the view of FIG. 9, however the top linkage is being displaced between the top position and the storage position.

On each of its two sides relative to the vertical longitudinal center plane of the top, the front bow 44 is connected to a deployment lever 72 which is pivotally mounted on the main link 34, which represents a roof link, via an articulation point 74. Moreover, a coupling link is jointed to each deployment lever 72 via an articulation point 75 and is secured by the bow link 54, which is connected to the bow link 56, which in turn represents a deployment link of the transverse bow 46, in an articulation point 76. The front bow 44 having the deployment links 72, the transverse bow 46 representing an additional bow and having the bow links 56 as well as the coupling links 54 form a fold section 78 of the top 16 in conjunction with top cover 28, said fold section 78 being displaced between a closing position illustrated in FIGS. 1, 2 and 4 and an opening position, which is illustrated in FIGS. 3 and 8 and in which a partial area of the vehicle roof 16 is opened, i.e. a roof cutout is formed above front seats of the vehicle.

The deployment links 72 can be secured to the respective main link 34 by means of a locking device 80 when in their lowered rest position allocated to the closing position. The locking device 80 comprises a glider 82 which can be displaced in the longitudinal direction on the respective main link 34 and comprises an oblong hole 84 for this purpose, into which two pins 86 and 88 engage which each form a terminal abutment for the glider 82. Moreover, the glider 82 is provided with a pull tab 90. At the rearward end of the glider 82, a locking pin 92 is arranged which can be provided with a roll and which interacts with a recess 94 formed on the underside of the deployment lever 72 of the fold section 78.

At the front side, the glider 82 has a jaw-like recess 96 which can be engaged with a locking pin 98 for fastening the main link 34, said locking pin 98 being arranged on a longitudinal beam 100 of a roll cage of the vehicle design 12 not further illustrated, realized as generally known and fixed on the vehicle construction.

The top described above can be actuated in the following described manner.

Figure 7:
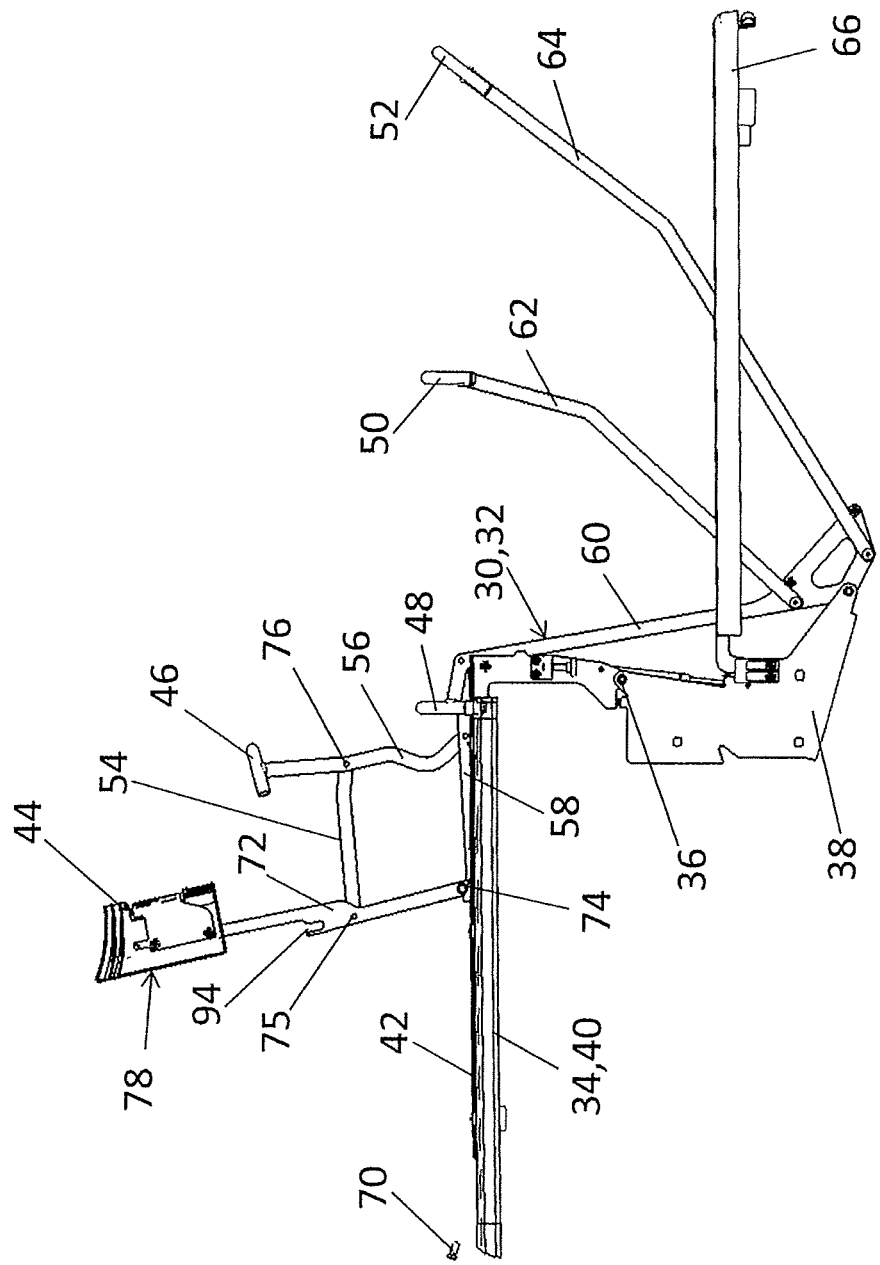
FIG. 7 illustrates the top linkage when in the top position, however when displacing the fold section into an opening position.

Starting from the top position illustrated in FIGS. 1, 2, 4 and 9, in which the front bow 44 is secured on the front wind apron 18 and in which the locking devices 80 are displaced in such a manner that the locking pins 92 engage into the recesses 94 of the deployment links 72, the locking mechanisms 68 are initially actuated in order to release the front bow 44 with respect to the front wind apron 18 and the sliders 82 are initially actuated in order to release the deployment links 72 with respect to the main links 34 in order to actuate the fold section 78. The sliders 82 are displaced until they move onto the abutments formed by the pins 86 and are engaged with locking pins 68 formed so as to be fixed on the vehicle. For this purpose, the main links 34 are fastened to the longitudinal beams 100 of the roll cage. Now, the fold section 78 can be manually pivoted from the closing position into a folded back opening position according to FIGS. 7 and 8 so that the top 16 is partially opened.

In order to return the fold section 78 into the closing position, the arrangement made up of the front bow 44, the transverse bow 46, the deployment links 72, the bow links 56, and the bow links 54 is pivoted forward until the front bow 44 reaches to the front wind apron 18. The locking mechanisms 68 can then be engaged with the locking bows 70, whereby the front bow 44 is secured to the front wind apron 18. In order to secure the deployment levers 72 to the main links 34, the sliders 82 are displaced manually towards the rear until they move onto the abutments formed by the pins 88. The locking pins 92 are then engaged with the recesses 94 of the deployment links 72.

Figure 5:
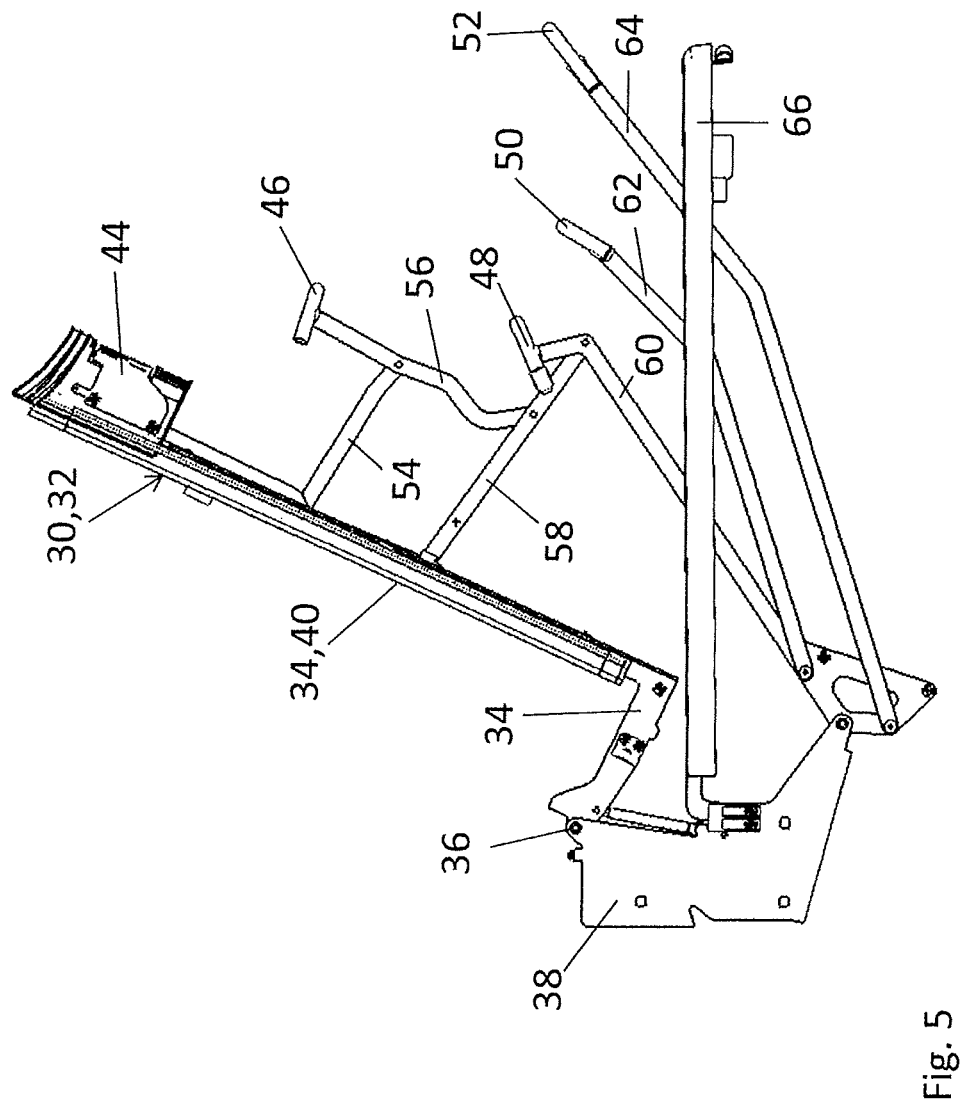
FIG. 5 illustrates a side view of the top linkage corresponding to the view of FIG. 4, however in an intermediary position when being displaced between the top position and a storage position.

If the top is to be brought into the storage position in its entirety, only the locking mechanisms 68 are removed from the locking bows 70, whereby the top can be brought from the top position into a storage position according to FIGS. 5 and 6.

The invention claimed is:

1. A top for a convertible vehicle, comprising a top linkage which can be displaced between a top or closing position spanning a vehicle interior and a storage position opening the vehicle interior upward and which comprises a link arrangement on both of its two sides relative to a vertical longitudinal center plane of the top, said link arrangements each being pivotally mounted on a main bearing fixed on the vehicle, said top linkage being able to be fastened to a front wind apron of the vehicle by means of a front bow, which connects the two link arrangements to each other, both link arrangements each comprising a roof link whose front end reaches to the front wind apron when the top linkage is in the top position, said front bow being fastened to a deployment link on each of its two sides relative to the vertical longitudinal center plane of the top, said deployment link being pivotally mounted on the respective roof link so that a fold section, which can be pivoted between a closing position, in which the deployment links extend along the roof links, and an opening position, in which the deployment links are pivoted with respect to the roof links, is formed by the front bow and the deployment link, said fold section taking up its closing position with respect to the roof links when pivoting the top linkage into the storage position.

2. The top according to claim 1, wherein the deployment links are secured to the roof links by means of a locking device when in the closing position.

3. The top according to claim 2, wherein the locking device comprises a glider which interacts with a locking counter-element arranged on the deployment link.

4. The top according to claim 2, wherein the locking device secures the roof links regarding a pivoting with respect to the vehicle construction when releasing the deployment links with respect to the roof links.

5. The top according to claim 1, wherein the roof links are each made of a main link pivotally mounted on the respective main link.

6. The top according to claim 1, wherein the fold section comprises an additional bow pivotally mounted via links and connected to the deployment links of the front bow via coupling links.

7. The top according to claim 1, wherein a top cover can be displaced by means of the top linkage and by means of the fold section.

8. A convertible vehicle, comprising a top for a convertible vehicle, comprising a top linkage which can be displaced between a top position spanning a vehicle interior and a storage position opening the vehicle interior upward and which comprises a link arrangement on both of its two sides relative to a vertical longitudinal center plane of the top, said link arrangements each being pivotally mounted on a main bearing fixed on the vehicle, said top linkage being able to be fastened to a front wind apron of the vehicle by means of a front bow, which connects the two link arrangements to each other, both link arrangements each comprising a roof link whose front end reaches to the front wind apron when the top linkage is in the closing position, said front bow being fastened to a deployment link on each of its two sides relative to the vertical longitudinal center plane of the top, said deployment link being pivotally mounted on the respective roof link so that a fold section, which can be pivoted between a closing position, in which the deployment links extend along the roof links, and an opening position, in which the deployment links are and the deployment link, said fold section taking up its closing position with respect to the roof links when pivoting the top linkage into the storage position.

\* \* \* \* \*